United States Patent
Pu et al.

(10) Patent No.: US 10,484,656 B1
(45) Date of Patent: Nov. 19, 2019

(54) DRIVER SYSTEM RESONANT FREQUENCY DETERMINATION

(71) Applicant: Microsoft Technology Licensing, LLC, Redmond, WA (US)

(72) Inventors: Chuan Pu, Foster City, CA (US); Wenjun Liao, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/217,609

(22) Filed: Dec. 12, 2018

(51) Int. Cl.
*G06F 3/038* (2013.01)
*G09G 5/00* (2006.01)
*H04N 9/31* (2006.01)

(52) U.S. Cl.
CPC .......... *H04N 9/3194* (2013.01); *G06F 3/038* (2013.01); *G09G 5/00* (2013.01); *H04N 9/3135* (2013.01)

(58) Field of Classification Search
CPC .... H04N 9/3194; H04N 9/3135; G06F 3/038; G09G 5/00
USPC .......... 345/204, 84, 108–111; 348/177, 739; 359/208, 212, 224, 263, 267, 318, 419, 359/471
See application file for complete search history.

(56) References Cited

U.S. PATENT DOCUMENTS

| | | | |
|---|---|---|---|
| 6,294,775 B1 * | 9/2001 | Seibel | A61B 1/0008 250/208.1 |
| 6,654,158 B2 * | 11/2003 | Helsel | G02B 26/0841 359/290 |
| 7,002,716 B2 | 2/2006 | Wine et al. | |
| 7,310,174 B2 * | 12/2007 | Wine | G02B 26/085 347/233 |
| 7,482,730 B2 | 1/2009 | Davis et al. | |
| 7,692,836 B2 * | 4/2010 | Yamazaki | H04N 9/3129 359/202.1 |
| 7,948,668 B2 | 5/2011 | Rothaar | |
| 7,952,783 B2 | 5/2011 | Holmes et al. | |
| 7,986,315 B2 * | 7/2011 | Sprague | G02B 27/104 345/204 |

(Continued)

FOREIGN PATENT DOCUMENTS

| | | |
|---|---|---|
| WO | 0237164 A1 | 5/2002 |
| WO | 2011108395 A1 | 9/2011 |

*Primary Examiner* — Trang U Tran
(74) *Attorney, Agent, or Firm* — Alleman Hall Creasman & Tuttle LLP

(57) ABSTRACT

A display device is provided, including a laser beam emitter, a fast-scan driver system including a nonlinear driver and a fast-scan MEMS sensor, and a slow-scan MEMS driver. The nonlinear driver and the slow-scan MEMS driver may respectively drive a fast-scan mirror and a slow-scan mirror. The display device may further include a signal generator configured to generate a periodic electrical signal. The nonlinear driver may receive, amplify, and drive the fast-scan mirror with the amplified electrical signal. The fast-scan MEMS sensor may detect a motion of the fast-scan mirror. The display device may further include a signal detector configured to receive and detect an amplitude difference between a periodic electrical signal and a fast-scan MEMS sensor output signal. The display device may further include a processor configured to receive the amplitude difference and determine a driver system resonant frequency of the fast-scan driver system.

20 Claims, 10 Drawing Sheets

(56) References Cited

U.S. PATENT DOCUMENTS

| | | | |
|---|---|---|---|
| 7,999,244 B2* | 8/2011 | Davis | G02B 23/2423 |
| | | | 250/559.29 |
| 8,248,541 B2 | 8/2012 | Brown et al. | |
| 8,355,013 B2 | 1/2013 | Sprague et al. | |
| 8,373,690 B2 | 2/2013 | Kurozuka | |
| 8,395,633 B2 | 3/2013 | Kurozuka | |
| 8,861,058 B2 | 10/2014 | Rothaar et al. | |
| 8,879,131 B2* | 11/2014 | Lin | H04N 9/3135 |
| | | | 345/207 |
| 9,612,433 B2 | 4/2017 | McVittie et al. | |
| 9,651,777 B2 | 5/2017 | Horibe et al. | |
| 10,069,278 B1* | 9/2018 | McVittie | H01S 5/06825 |
| 2008/0001850 A1 | 1/2008 | Champion et al. | |
| 2017/0285327 A1* | 10/2017 | Duvdevany | G02B 7/1821 |

\* cited by examiner

US 10,484,656 B1

DRIVER SYSTEM RESONANT FREQUENCY DETERMINATION

BACKGROUND

Some display devices form displayed images by using mirrors to direct a laser beam onto a display region. In such display devices, the mirrors may move over the course of a frame to control the location in the display region toward which the laser beam is directed. The mirrors may be moved using a microelectromechanical systems (MEMS) driver. The MEMS drivers may be driven using a periodic electrical signal.

In such display devices, it is desirable for the MEMS driver to be driven at a frequency close to its resonant frequency. However, due to changes in environmental conditions, wear and tear on display device components, and/or other changes to the display device, the resonant frequency of the MEMS driver may change over time. Thus, when changes to the resonant frequency occur, the efficiency of the MEMS driver may be reduced due to the MEMS driver being driven at a frequency other than its resonant frequency. In addition, imprecise control of the mirrors due to changes in resonant frequency may result in distortion of the displayed image.

SUMMARY

According to one aspect of the present disclosure, a display device is provided, including a laser beam emitter configured to emit a laser beam. The display device may further include a fast-scan driver system including a nonlinear driver and a fast-scan MEMS sensor. The display device may further include a slow-scan MEMS driver. The nonlinear driver and the slow-scan MEMS driver may be respectively configured to drive a fast-scan mirror and a slow-scan mirror. The slow-scan mirror and the fast-scan mirror may be configured to reflect the laser beam onto a display region. The display device may further include a signal generator configured to generate a periodic electrical signal having a first frequency in response to receiving periodic electrical signal instructions. The nonlinear driver may be configured to receive the periodic electrical signal from the signal generator, amplify the periodic electrical signal to produce an amplified signal, and drive the fast-scan mirror with the amplified electrical signal. The fast-scan MEMS sensor may be configured to detect a motion of the fast-scan mirror. The display device may further include a signal detector configured to receive the periodic electrical signal from the signal generator and a fast-scan MEMS sensor output signal from the fast-scan MEMS sensor. The signal detector may be further configured to detect an amplitude difference between the periodic electrical signal and the fast-scan MEMS sensor output signal. The display device may further include a processor configured to receive the amplitude difference from the signal detector and determine, based on the amplitude difference, a driver system resonant frequency of the fast-scan driver system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
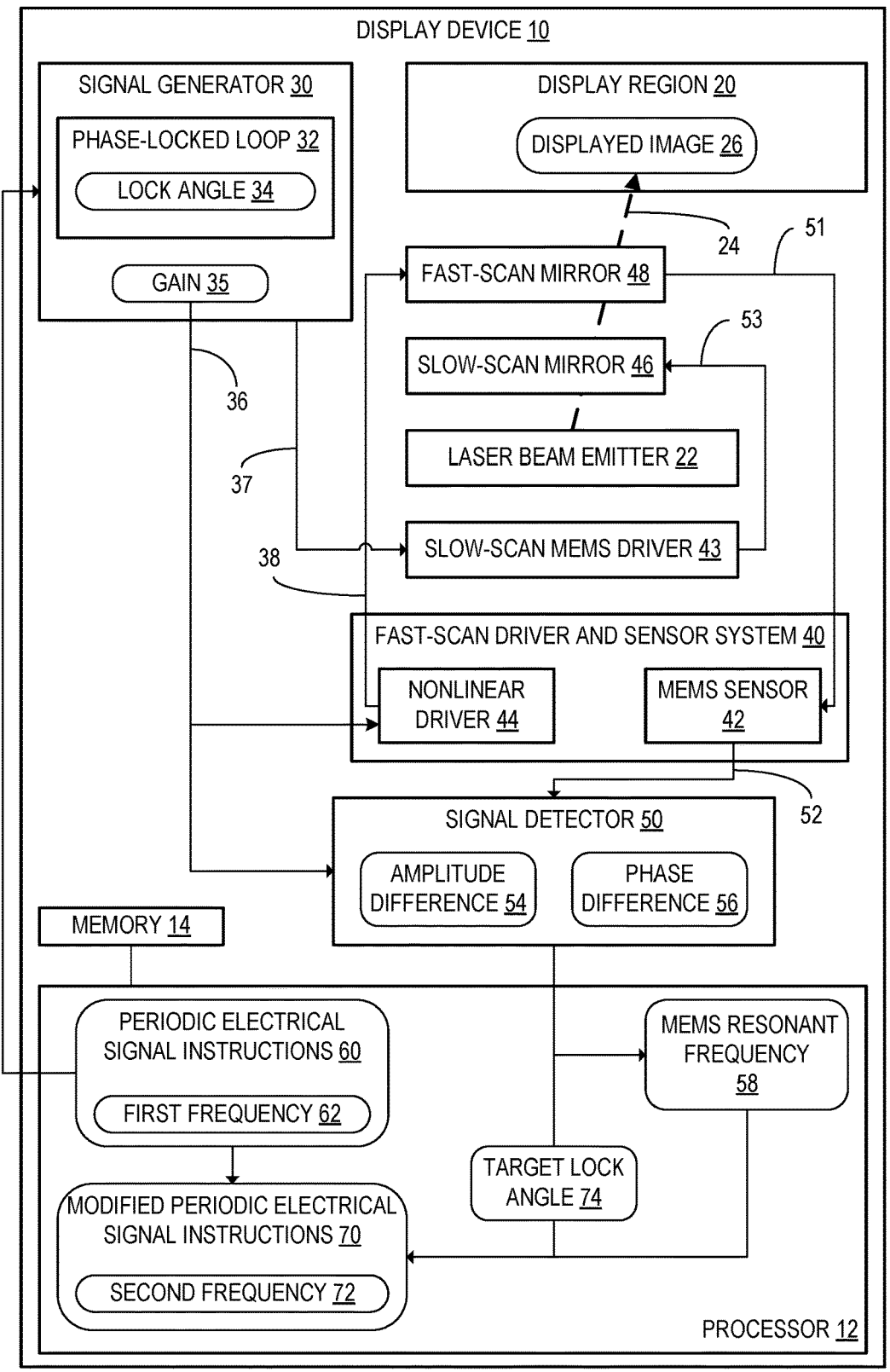
FIG. 1 schematically shows a display device, according to one embodiment of the present disclosure.

In order to address the problems discussed above, the inventors have conceived of the systems and methods provided below. FIG. 1 schematically shows a display device 10 according to one embodiment of the present disclosure. The display device 10 may include a laser beam emitter 22 configured to emit a laser beam 24. For example, the laser beam emitter 22 may be a laser diode. The laser beam 24 may impinge upon a display region 20 of the display device 10 to form a displayed image 26. For example, the display region 20 may be a display of a head-mounted display device and the displayed image 26 may include one or more virtual objects, as discussed below with reference to FIG. 7.

Figure 2:
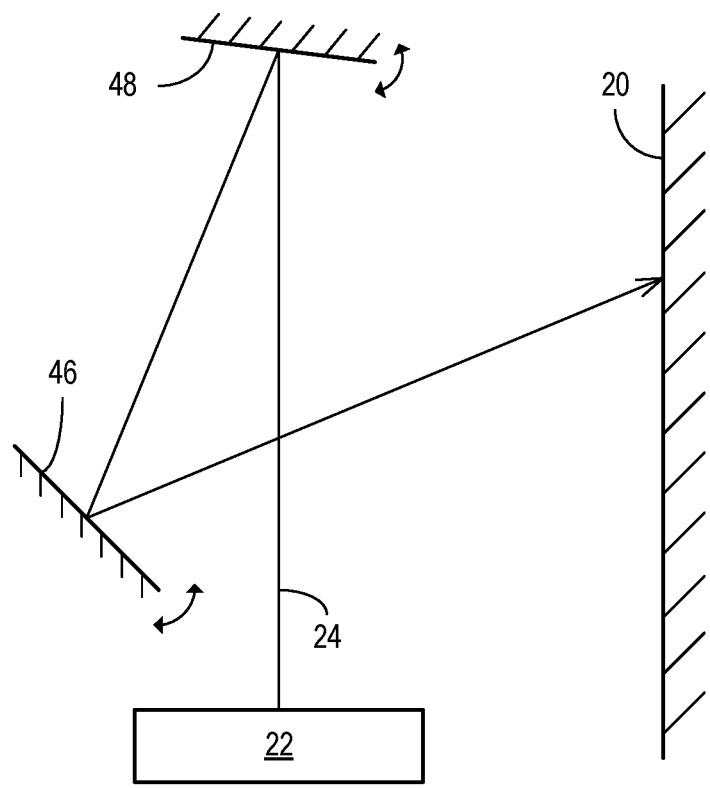
FIG. 2 shows a fast-scan mirror and a slow-scan mirror reflecting a laser beam onto a display region, according to the embodiment of FIG. 1.
Figure 3:
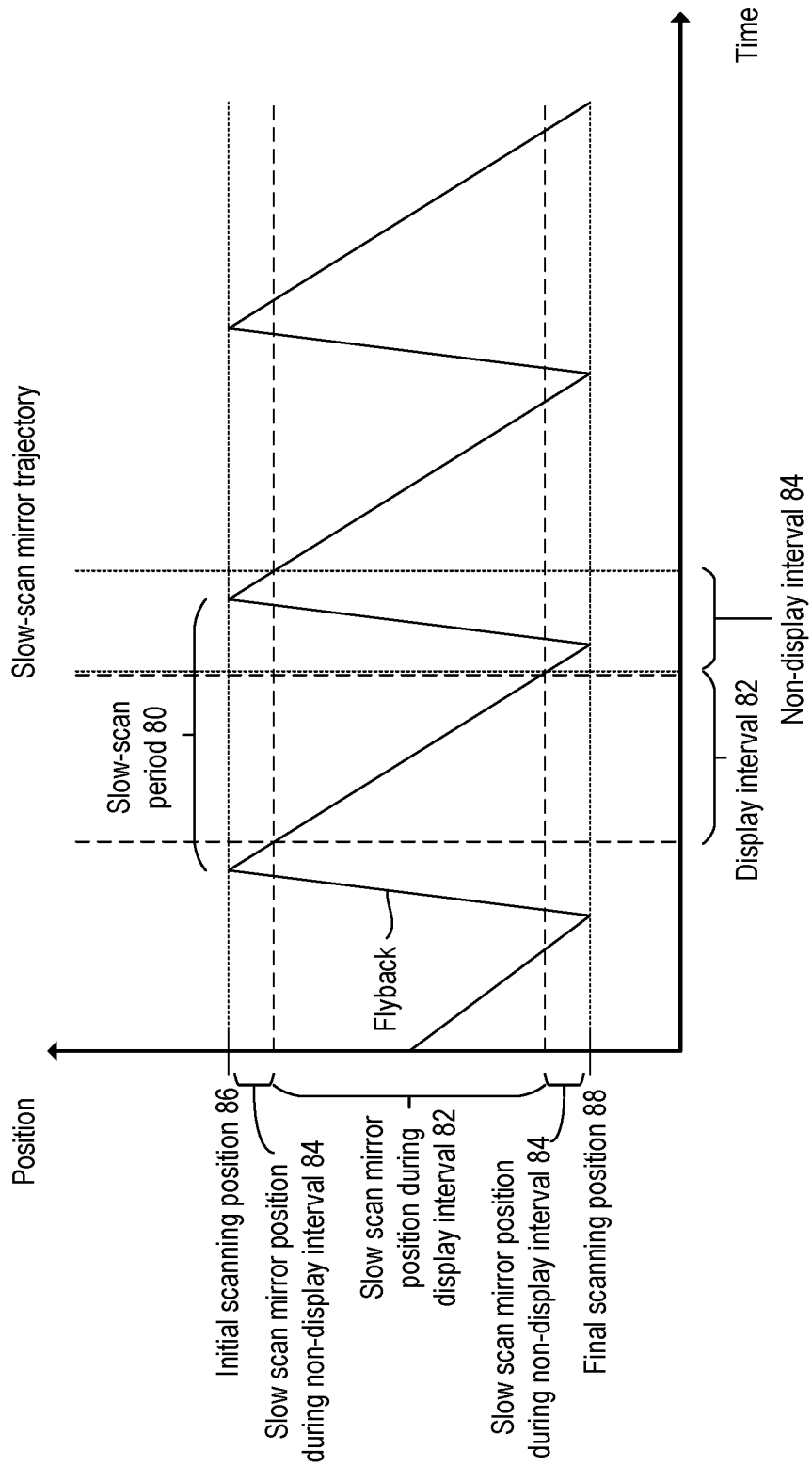
FIG. 3 shows an example slow-scan mirror trajectory, according to the embodiment of FIG. 1.

The display device 10 may further include a slow-scan mirror 46 and a fast-scan mirror 48. The slow-scan mirror 46 and the fast-scan mirror 48 may be configured to reflect the laser beam 24 onto the display region 20, as shown in FIG. 2. The displayed image 26 may be displayed in one or more frames in which the slow-scan mirror 46 and the fast-scan mirror 48 direct the laser beam 24 across the display region 20 to "draw" the displayed image 26. In some embodiments, as shown in FIG. 3, the slow-scan mirror 46 may be configured to complete a slow-scan period 80 during each frame. The slow-scan period 80 may include a display interval 82. As shown in the example embodiment of FIG. 3, the slow-scan mirror 46 may linearly scan across the display region 20 from an initial scanning position 86 to a final scanning position 88. The laser beam emitter 22 may be configured to emit the laser beam 24 during the display interval 82. In the display interval 82, the fast-scan mirror 48 may perform a plurality of scans across the display region 20 to "draw" the displayed image 26.

The slow-scan period 80 may further include a non-display interval 84. During the non-display interval 84, the slow-scan mirror 46 may be configured to return from the final scanning position 88 to the initial scanning position 86. This portion of the non-display interval 84 may also be referred to as the flyback. During the non-display interval 84, the laser beam emitter 22 may be configured to not emit the laser beam 24. In some embodiments, as shown in the example of FIG. 3, the display region 20 may include one or more blank regions in which the displayed image 26 is not displayed. In addition to the flyback, the non-display interval 84 may include time during which the slow-scan mirror 46 is oriented toward the one or more blank regions. The initial scanning position 86 and the final scanning position 88 may be located in the one or more blank regions, as shown in FIG. 3.

Returning to FIG. 1, the fast-scan mirror 48 may be driven by a nonlinear driver 44, which may be included in a fast-scan driver and sensor system 40. The fast-scan driver and sensor system 40 may further include a fast-scan MEMS sensor 42. The fast-scan MEMS sensor 42 may be configured to detect a motion of the fast-scan mirror 48. For example, the fast-scan mirror 48 may be configured to transmit a fast-scan mirror output signal 51 to the fast-scan MEMS sensor 42. The fast-scan mirror 48 and the nonlinear driver 44 may together have a MEMS resonant frequency 58. In addition to the fast-scan MEMS sensor 42 and the nonlinear driver 44, the display device 10 may further include a slow-scan MEMS driver 43 configured to drive the slow-scan mirror 46.

The display device 10 may further include a signal generator 30. In order to drive the fast-scan driver system 40, the signal generator 30 may be configured to generate a periodic electrical signal 36 having a first frequency 62. For example, the periodic electrical signal 36 may be a sine wave, a square wave, a triangle wave, a sawtooth wave, or some other type of periodic wave. The periodic electrical signal 36 may be used to drive the fast-scan mirror 48. The signal generator 30 may be configured to generate the periodic electrical signal 36 based on periodic electrical signal instructions 60 received from a processor 12 included in the display device 10, as discussed in further detail below. The periodic electrical signal instructions 60 may indicate the first frequency 62 at which the nonlinear driver 44 is configured to drive the fast-scan mirror 48.

The slow-scan mirror 46 may be driven by the slow-scan MEMS driver 43 separately from the fast-scan mirror 48. The slow-scan mirror 46 may be driven by another periodic electrical signal 37 received from the signal generator 30. The other periodic electrical signal 37 may, in some embodiments, complete one period every slow-scan period 80. For example, the other periodic electrical signal 37 may drive the slow-scan mirror with a sawtooth waveform, as shown in FIG. 3.

The nonlinear driver 44 may be configured to receive the periodic electrical signal 36 from the signal generator 30. The nonlinear driver 44 may be further configured to amplify the periodic electrical signal 36 to produce an amplified signal 38. The nonlinear driver 44 may be nonlinear in that its gain may vary as a function of the frequency of the periodic electrical signal 36. Using a nonlinear driver 44 rather than a linear driver may have the advantage of allowing the fast-scan driver system 40 to more efficiently drive the fast-scan mirror 48. The nonlinear driver 44 may be further configured to transmit the amplified signal 38 to the fast-scan mirror 48 to drive the fast-scan mirror 48.

The display device 10 may further include a signal detector 50. The signal detector 50 may be configured to receive the periodic electrical signal 36 from the signal generator 30. The signal detector 50 may be further configured to receive a fast-scan MEMS sensor output signal 52 from the fast-scan MEMS sensor 42. The signal detector may be further configured to detect an amplitude difference 54 and/or a phase difference 56 between the periodic electrical signal 36 and the fast-scan MEMS sensor output signal 52. The phase difference is detected, for example, from the interference between the periodic electrical signal 36 and the fast-scan MEMS sensor output signal 52.

The display device 10 may further include a processor 12, which may be operatively coupled to memory 14. In some embodiments, the processor 12 may be configured to receive the amplitude difference 54 and/or the phase difference 56 from the signal detector 50. In other embodiments, the processor 12 may receive the periodic electrical signal 36 and the fast-scan MEMS sensor output signal 52 rather than receiving the amplitude difference 54 from the signal detector 50. The processor 12 may be further configured to determine, based on the amplitude difference 54, the driver system resonant frequency 58 of the fast-scan driver system 40. In some embodiments, as discussed above, the processor 12 may be configured to determine the driver system resonant frequency 58 at least in part by determining a phase difference 56 between the periodic electrical signal 36 and the fast-scan MEMS sensor output signal 52. In such embodiments, the processor 12 may be configured to determine the phase difference 56 at least in part by performing a fast Fourier transform on the amplitude difference signal received from the signal detector 50.

Figure 4:
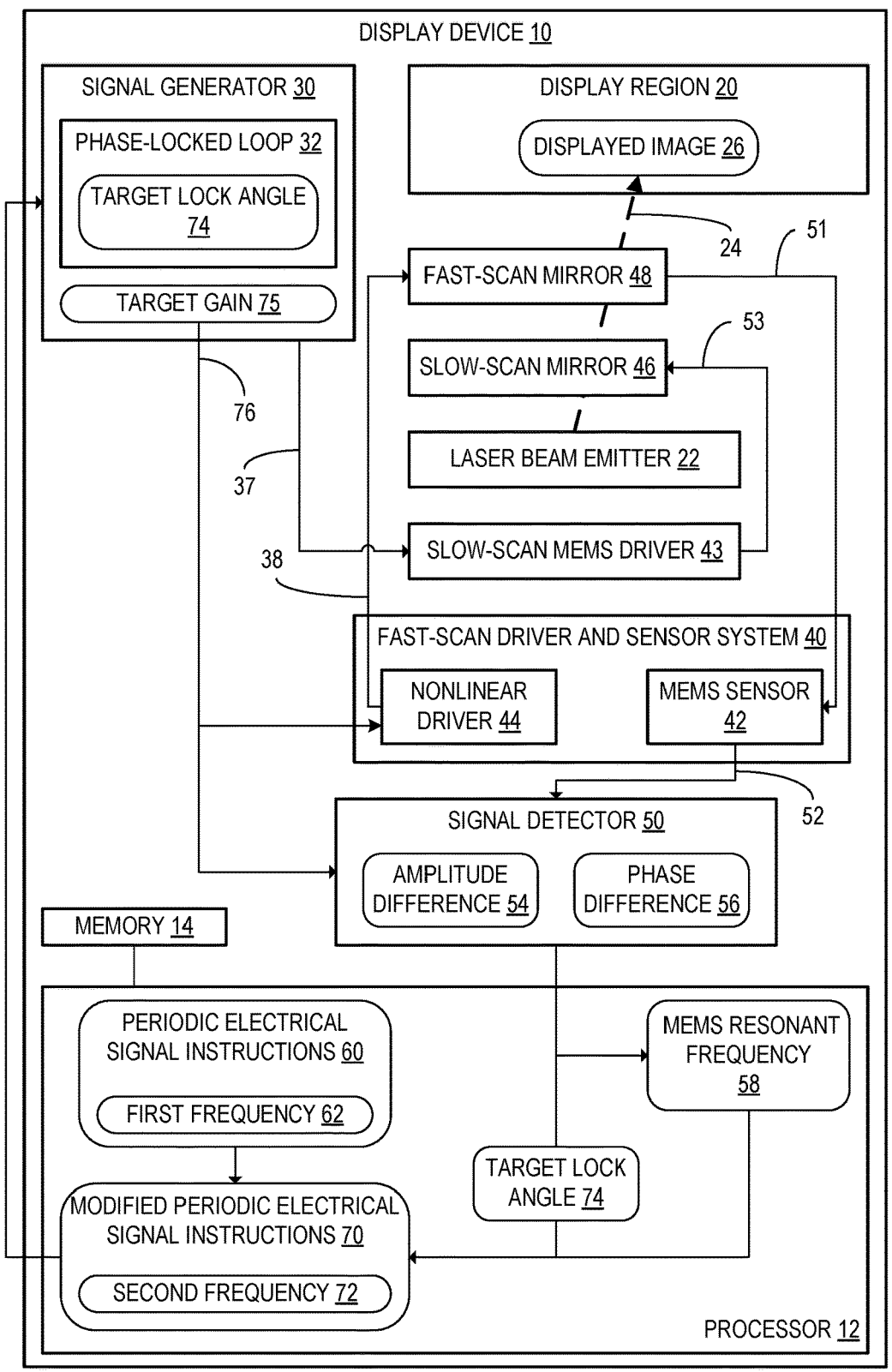
FIG. 4 shows the display device of FIG. 1 when the frequency of the periodic electrical signal is modified, according to the embodiment of FIG. 1.

In some embodiments, the processor 12 may be further configured to generate modified periodic electrical signal instructions 70 based on the driver system resonant frequency 58. The modified periodic electrical signal instructions 70 may include a second frequency 72 different from the first frequency 62. The processor 12 may be further configured to transmit the modified periodic electrical signal instructions 70 to the signal generator 30, as shown in FIG. 4. In response to receiving the modified periodic electrical signal instructions 70, the signal generator 30 may be configured to generate a modified periodic electrical signal 76 with the second frequency 72. In some embodiments, the second frequency 72 may be the driver system resonant frequency 58.

Figure 5:
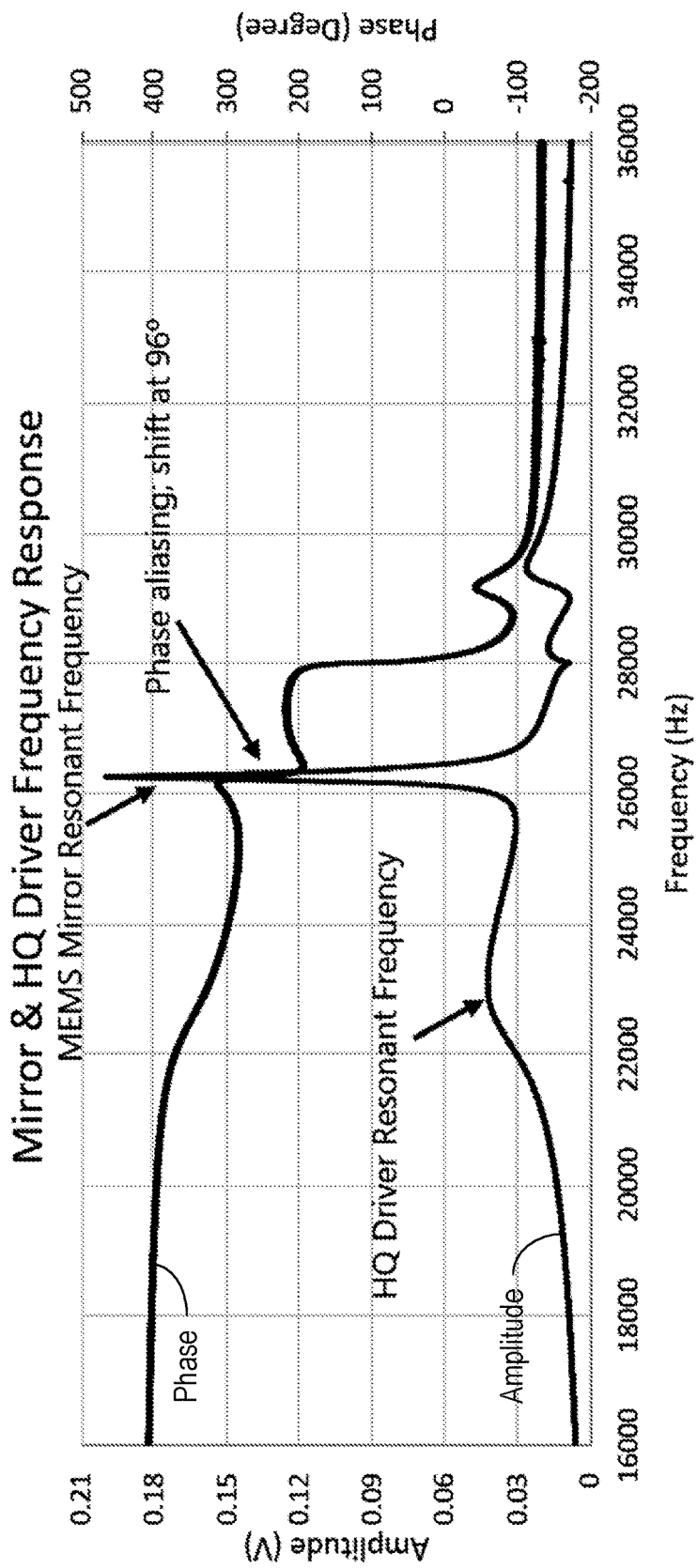
FIG. 5 shows an example plot of the amplitude and phase of the fast-scan driver system, according to the embodiment of FIG. 1.

In some embodiments, the signal generator 30 may include a phase-locked loop 32. In such embodiments, the phase-locked loop 32 may have a lock angle 34 between the periodic electrical signal 36 and the fast-scan MEMS sensor output signal 52. FIG. 5 shows an example plot of the amplitude and phase of the fast-scan driver system 40 in an embodiment in which the lock angle is 96°. If a linear driver were used rather than the nonlinear driver 44, the phase difference 56 between the periodic electrical signal 36 and the fast-scan MEMS sensor output signal 52 would be 90°. However, using the nonlinear driver 44 instead of a linear driver may result in a phase difference other than 90° due to phase aliasing between the nonlinear driver 44 and the fast-scan mirror 48. The lock angle 34 may be set to 96° in the example of FIG. 5 in order to match the 96° offset between the periodic electrical signal 36 and the fast-scan MEMS sensor output signal 52 and allow the fast-scan driver system 40 to operate at the MEMS resonant frequency 58. It will be appreciated that these specific lock angles are merely exemplary and other lock angles are possible.

In embodiments in which the signal generator 30 includes a phase-locked loop 32, the processor 12 may be configured to generate the modified periodic electrical signal instructions 70 at least in part by modifying a lock angle 34 of the phase-locked loop 32 to have a target lock angle 74. Additionally or alternatively, the processor 12 may be further configured to determine the driver system resonant frequency 58 at least in part by determining a gain 35 of the signal generator 30. when the fast-scan driver system 40 receives the periodic electrical signal 36 from the signal generator 30. The processor 12 may determine the gain 35 of the phase-locked loop 32 in embodiments in which the processor 12 receives the periodic electrical signal 36 from the signal generator 30. In such embodiments, the processor 12 may modify the first frequency 62 such that the signal generator 30 has a target gain 75. The target gain 75 may be a minimum gain.

Figure 6:
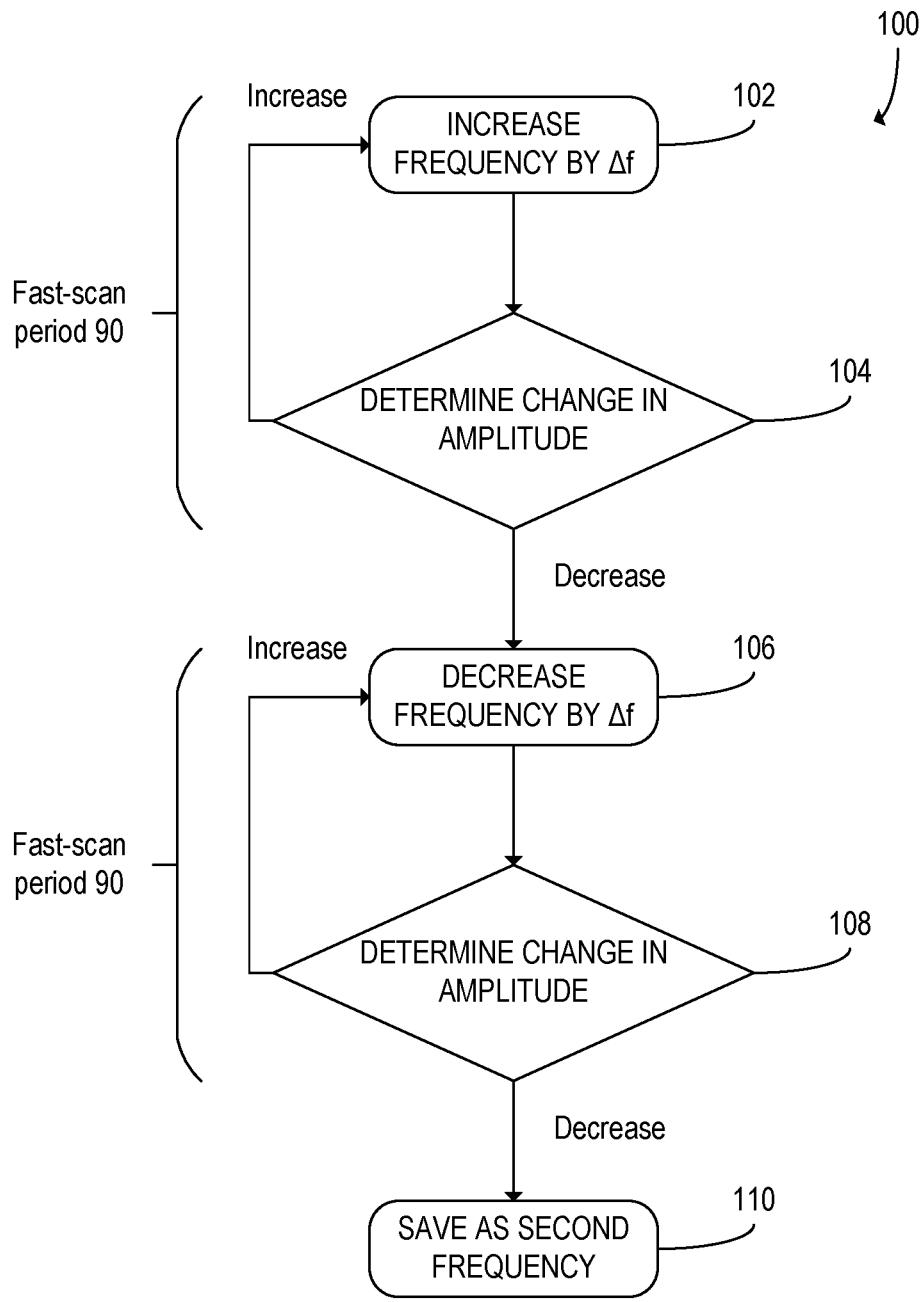
FIG. 6 shows a flowchart of a method for modifying the frequency of the periodic electrical signal, according to the embodiment of FIG. 1.

FIG. 6 shows a method 100 for searching for a resonance peak of the fast-scan driver system 40. In some embodiments, the processor 12 may be configured to determine the driver system resonant frequency 58 at least in part by detecting a plurality of amplitude differences 54 in a respective plurality of fast-scan periods 90. The plurality of fast-scan periods 90 may occur during the non-display interval 84. Alternatively, the plurality of fast-scan periods 90 may occur in both the display interval 82 and the non-display interval 84, or only in the display interval 82. The processor 12 may be further configured to iteratively update the first frequency 62 over the plurality of fast-scan periods 90 to determine the second frequency 72. At step 102 of the flowchart 100 shown in FIG. 6, the processor 12 may increase the first frequency 62 indicated in the periodic electrical signal instructions 60 by a change in frequency $\Delta f$. The modified periodic electrical signal instructions 70 with this increase in frequency may be transmitted to the signal generator 30 and executed to generate a modified periodic electrical signal 76 as shown in FIG. 4.

At step 104, the processor 12 may determine the change in the amplitude of the fast-scan MEMS sensor output signal 52 resulting from the increase in the frequency. The change in amplitude may be a change in the amplitude difference 54 between the previous fast-scan period 90 and the current fast-scan period 90. When the amplitude increases, the processor 12 may repeat step 102 and increase the frequency by $\Delta f$ again. However, when the amplitude decreases, the processor 12 may decrease the frequency indicated in the periodic electrical signal instructions 60 by a change in frequency $\Delta f$. In other embodiments, the processor 12 may decrease the first frequency 62 by some other amount.

The processor 12 may be further configured to, at step 108, determine the change in the amplitude of the fast-scan MEMS sensor output signal 52 following the decrease in the frequency. When the frequency increases, the processor 12 may repeat step 106. When the frequency increases, the processor 12 may instead save the current frequency as the second frequency 72. In embodiments in which the signal generator 30 includes a phase-locked loop 32, saving the current frequency as the second frequency 72 may include modifying the lock angle 34 of the phase-locked loop 32. Additionally or alternatively, the current frequency may be saved as the second frequency 72 in the memory 14 of the display device 10.

Thus, via the method of FIG. 6, the processor 12 may search for the resonance peak of the MEMS sensor output signal 52 by iteratively increasing and/or decreasing the frequency of the periodic electrical signal 36 and determining the change in the amplitude of the MEMS sensor output signal 52 to search for a peak in the amplitude. Although FIG. 6 shows the increase in frequency at step 102 prior to the decrease in frequency at step 106, the method 100 may include decreasing the frequency of the periodic electrical signal 36 prior to increasing the frequency in other embodiments. In addition, in embodiments in which the processor 12 is configured to determine the change in the gain 35 of the signal generator 30 while the amplitude difference is kept constant, the searching method shown in FIG. 6 may be applied to the gain 35 rather than the amplitude of the fast-scan MEMS sensor output signal 52. In addition, the search for the gain 35 is not limited to the non-display interval 84.

Figure 7:
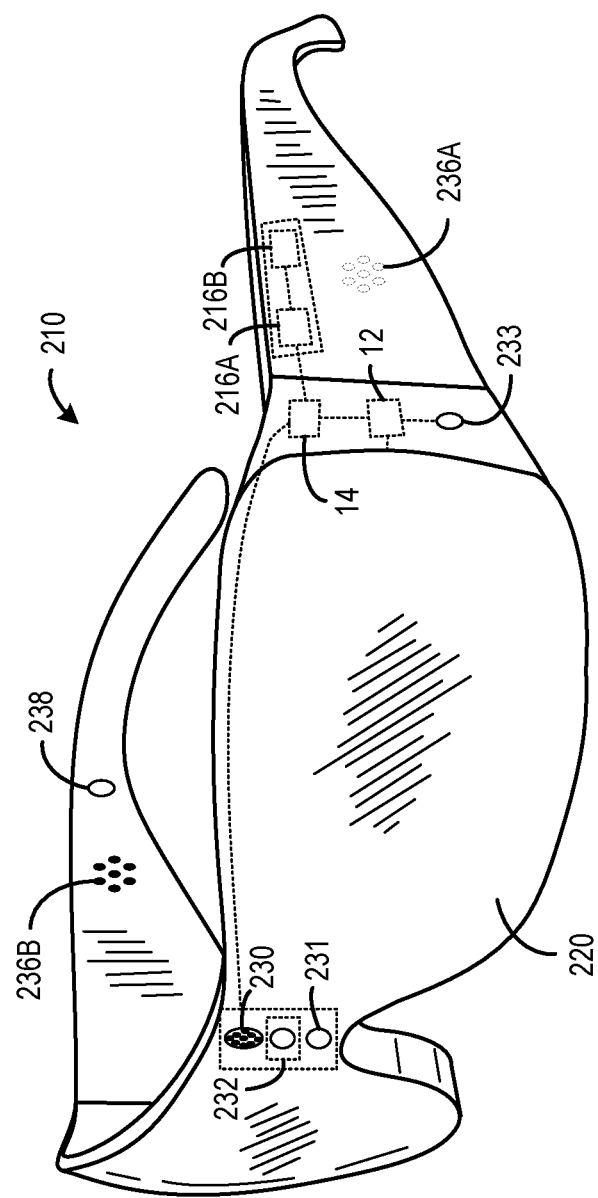
FIG. 7 shows the display device of FIG. 1 in the form of a head-mounted display device.

FIG. 7 shows an example embodiment of the display device 10 in which the display device 10 is a head-mounted display device 210 having the form of wearable glasses or goggles, but it will be appreciated that other forms are possible. The head-mounted display device 210 may include an output device suite including a display 220. In some embodiments, the head-mounted display device 210 may be configured in an augmented reality configuration to present an augmented reality environment, and thus the display 220 may be an at least partially see-through stereoscopic display configured to visually augment an appearance of a physical environment being viewed by the user through the display 220. In some examples, the display 220 may include one or more regions that are transparent (e.g. optically clear) and may include one or more regions that are opaque or semi-transparent. In other examples, the display 220 may be transparent (e.g. optically clear) across an entire usable display surface of the display 220.

The output device suite of the head-mounted display device 210 may, for example, include an image production system that is configured to display one or more virtual objects to the user with the display 220. The processor 12 may be configured to output for display on the display 220 a mixed reality experience including one or more virtual objects superimposed upon the physical environment. In the augmented reality configuration with an at least partially see-through display, the virtual objects are visually superimposed onto the physical environment that is visible through the display 220 so as to be perceived at various depths and locations. In one embodiment, the head-mounted display device 210 may use stereoscopy to visually place a virtual object at a desired depth by displaying separate images of the virtual object to both of the user's eyes. Using this stereoscopy technique, the head-mounted display device 210 may control the displayed images of the virtual objects, such that the user will perceive that the virtual objects exist at a desired depth and location in the viewed physical environment.

Alternatively, the head-mounted display device 210 may be configured in a virtual reality configuration to present a full virtual reality environment, and thus the display 220 may be a non-see-though stereoscopic display. The head-mounted display device 210 may be configured to display virtual three-dimensional environments to the user via the non-see-through stereoscopic display. The head-mounted display device 210 may be configured to display a virtual representation such as a three-dimensional graphical rendering of the physical environment in front of the user that may include additional virtual objects. Displaying the virtual representation of the physical environment may include generating a two-dimensional projection of a three-dimensional model of the physical environment onto the surface of the display 220. As another alternative, the computing system may include a portable computing device that is not head mounted, such as a smartphone or tablet computing device. In such a device, camera-based augmented reality may be achieved by capturing an image of the physical environment through a forward-facing camera and displaying the captured image on a user-facing display along with world locked graphical images superimposed on the captured image. While the computing system is primarily described in terms of the head-mounted display device 210 herein, it will be appreciated that many features of the head-mounted display device 210 are also applicable to such a portable computing device that is not head mounted.

The output device suite of the head-mounted display device 210 may further include one or more speakers 236 configured to emit sound. In some embodiments, the head-mounted display device 210 may include at least a left speaker 236A and a right speaker 236B situated such that the left speaker 236A may be located proximate the user's left ear and the right speaker 236B may be located proximate the user's right ear when the head-mounted display device 210 is worn. Thus, the one or more speakers 236 may emit stereo sound output. The output device suite may further include one or more haptic feedback devices 238 configured to provide tactile output (e.g. vibration).

The head-mounted display device 210 may include an input device suite including one or more input devices. The input device suite of the head-mounted display device 210 may include one or more optical sensors. In one example, the input device suite includes an outward-facing optical sensor 230 that may be configured to detect the real-world background from a similar vantage point (e.g., line of sight) as observed by the user through the display 220 in an augmented reality configuration. The input device suite may additionally include an inward-facing optical sensor 231 that may be configured to detect a gaze direction of the user's eyes. It will be appreciated that the outward facing optical sensor 230 and/or the inward-facing optical sensor 231 may include one or more component sensors, including an RGB camera and a depth camera. The RGB camera may be a high definition camera or have another resolution. The depth camera may be configured to project non-visible light and capture reflections of the projected light, and based thereon, generate an image comprised of measured depth data for each pixel in the image. This depth data may be combined with color information from the image captured by the RGB camera, into a single image representation including both color data and depth data, if desired.

The input device suite of the head-mounted display device 210 may further include a position sensor system that may include one or more position sensors 232 such as accelerometer(s), gyroscope(s), magnetometer(s), global positioning system(s), multilateration tracker(s), and/or other sensors that output position data as a position, orientation, and/or movement of the relevant sensor. The input device suite may further include one or more microphones 233 configured to collect sound data.

Optical sensor information received from the one or more optical sensors and/or position data received from position sensors 232 may be used to assess a position and orientation of the vantage point of head-mounted display device 210 relative to other environmental objects. In some embodiments, the position and orientation of the vantage point may be characterized with six degrees of freedom (e.g., world-space X, Y, Z, pitch, roll, yaw). The vantage point may be characterized globally or independent of the real-world background. The position and/or orientation may be determined by the processor 12 of the head-mounted display device 210 and/or by an off-board computing system.

Furthermore, the optical sensor information and the position sensor information may be used by the head-mounted display system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location. The virtual model is a three-dimensional model and may be referred to as "world space," and may be contrasted with the projection of world space viewable on the display 220, which is referred to as "screen space." Additionally, the optical sensor information received from the one or more optical sensors may be used to identify and track objects in the field of view of the one or more optical sensors. The optical sensors may also be used to identify machine recognizable visual features in the physical environment and use the relative movement of those features in successive frames to compute a frame to frame relative pose change for the head mounted display device 210 within the world space of the virtual model.

The head-mounted display device 210 may further include a communication system including one or more communication devices 216, which may include one or more receivers 216A and/or one or more transmitters 216B. In embodiments in which the head-mounted display device 210 communicates with an off-board computing system, the one or more receivers 216A may be configured to receive data from the off-board computing system, and the one or more transmitters 216B may be configured to send data to the off-board computing system. In some embodiments, the head-mounted display device 210 may communicate with the off-board computing system via a network, which may be a wireless local- or wide-area network. Additionally or alternatively, the head-mounted display device 210 may communicate with the off-board computing system via a wired connection. The head-mounted display device 210 may be further configured to communicate with a server computing system via the communication system.

Figure 8A:
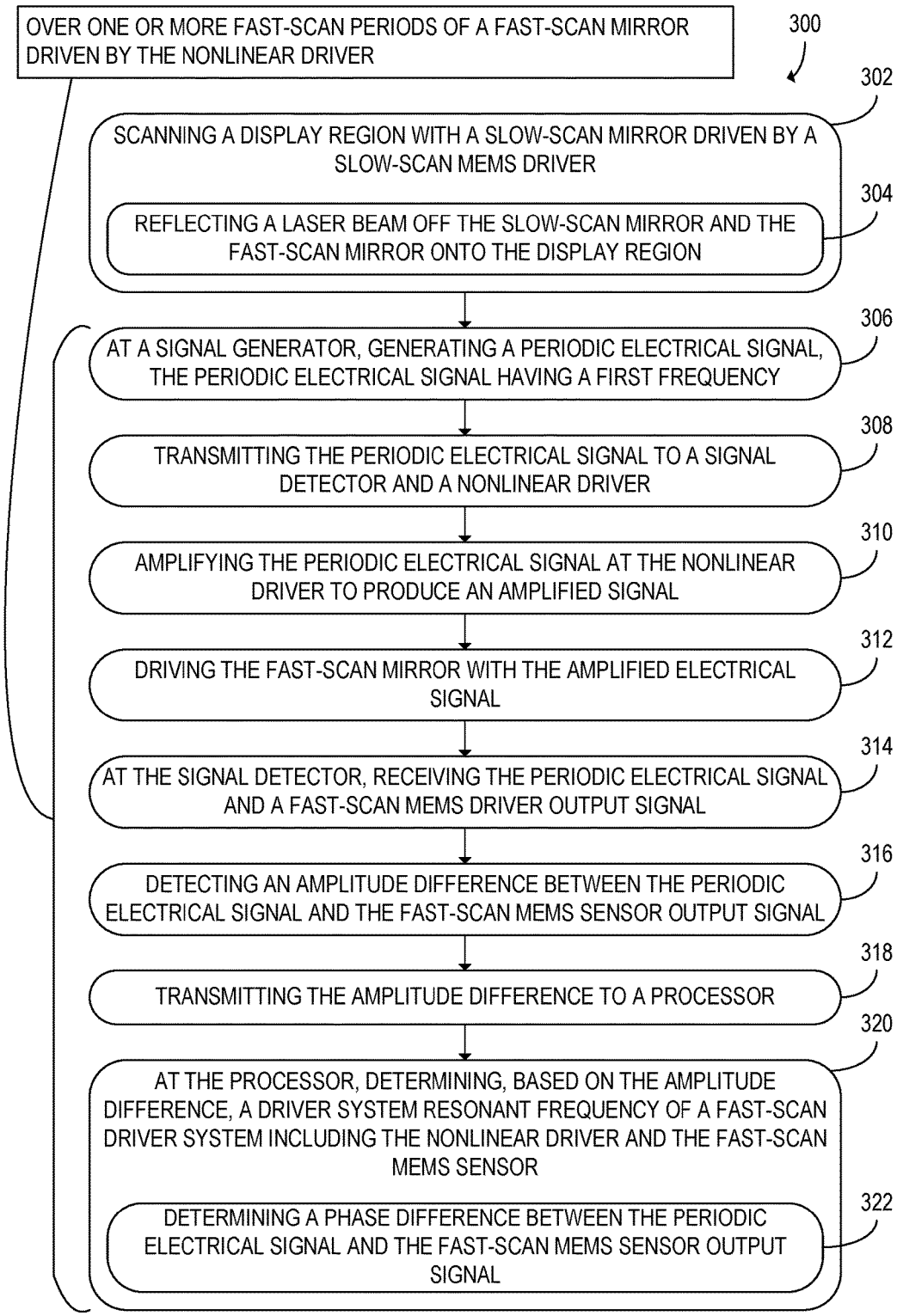
FIG. 8A shows a method for use with a display device, according to the embodiment of FIG. 1.

FIG. 8A shows a flowchart of a method 300 for use with a display device, according to one example embodiment. The display device may be the display device 10 of FIG. 1 or may alternatively be some other display device. The method 300 may include, at step 302, scanning a display region with a slow-scan mirror driven by a slow-scan MEMS driver. The slow-scan mirror may scan the display region once per frame during a display interval. During the display interval, the slow-scan mirror may move from an initial scanning position to a final scanning position. While the slow-scan mirror scans the display region, a fast-scan mirror driven by a nonlinear driver may also scan the display region to "draw" a displayed image on the display region. The fast-scan mirror may scan the display region multiple times in a plurality of fast-scan periods during each slow-scan period. In some embodiments, scanning the display region may include, at step 304, reflecting a laser beam off the slow-scan mirror and the fast-scan mirror onto the display region. At the end of the display interval, the slow-scan mirror may return from the final scanning position to the initial scanning position during a non-display interval.

The steps of the method 300 discussed below may be performed over one or more fast-scan periods of a fast-scan mirror driven by the nonlinear driver. At step 306, the method 300 may include, at a signal generator, generating a periodic electrical signal. The periodic electrical signal may have a first frequency and may be generated based on periodic electrical signal instructions received from a processor. The method 300 may further include, at step 308, transmitting the periodic electrical signal to a signal detector and a nonlinear driver. The nonlinear driver may be included in a fast-scan driver system along with a fast-scan MEMS sensor.

At step 310, the method 300 may further include amplifying the periodic electrical signal at the nonlinear driver to produce an amplified signal. The nonlinear driver may amplify the periodic electrical signal with a gain that varies as a function of the amplitude of the periodic electrical signal. The method 300 may further include, at step 312, driving the fast-scan mirror with the amplified electrical signal. The fast-scan mirror may transmit a fast-scan mirror output signal to the MEMS sensor, which may transmit a fast-scan MEMS sensor output signal to the signal detector.

At step 314, the method 300 may further include receiving the periodic electrical signal and a fast-scan MEMS sensor output signal at the signal detector. At step 316, the method 300 may further include, at the signal detector, detecting an amplitude difference between the periodic electrical signal and the fast-scan MEMS sensor output signal. For example, the periodic electrical signal may destructively interfere with the fast-scan MEMS sensor output signal at the signal detector. At step 318, the method 300 may further include transmitting the amplitude difference to a processor. Alternatively, instead of detecting the amplitude difference at a signal detector, the periodic electrical signal and the fast-scan MEMS sensor output signal may be transmitted to the processor and the amplitude difference may be determined at the processor.

At step 320, the method 300 may further include determining a driver system resonant frequency of a fast-scan driver system including the nonlinear driver and the fast-scan MEMS sensor. The driver system resonant frequency may be determined at the processor based on the amplitude difference. Step 320 may further include step 322, at which the method 300 may include determining a phase difference between the periodic electrical signal and the fast-scan MEMS sensor output signal.

Figure 8B:
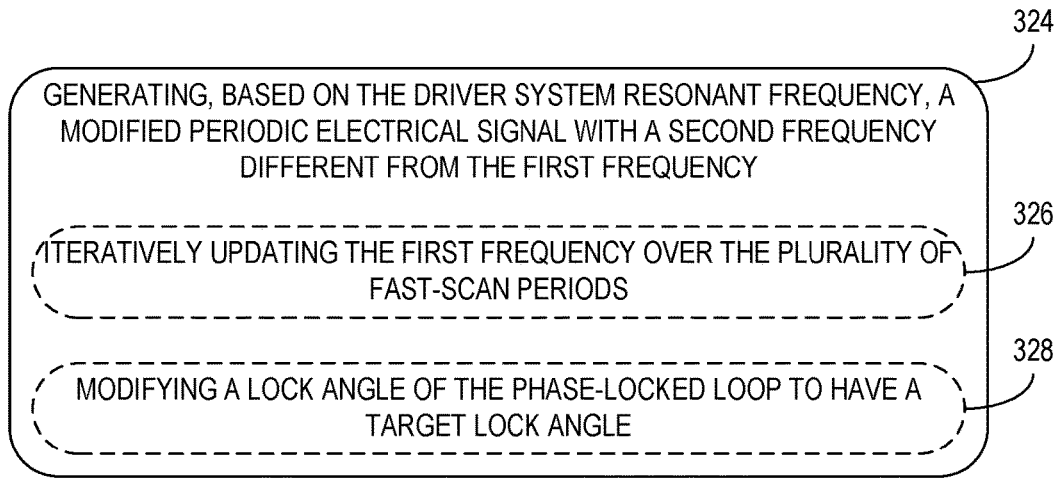
FIGS. 8B and 8C show additional steps that may optionally be performed when performing the method of FIG. 8A.

The method 300 of FIG. 8A may further include the following optional steps shown in FIG. 8B. At step 324, the method 300 may further include generating, based on the driver system resonant frequency, a modified periodic electrical signal with a second frequency different from the first frequency. In some embodiments, the second frequency may be the driver system resonant frequency. The modified periodic electrical signal may be generated based on modified periodic electrical signal instructions received from the processor. In some embodiments, generating the modified periodic electrical signal may include, at step 326, iteratively updating the first frequency over the plurality of fast-scan periods. In embodiments in which the signal generator includes a phase-locked loop, generating the modified periodic electrical signal may further include, at step 328, modifying a lock angle of the phase-locked loop to have a target lock angle.

Figure 8C:
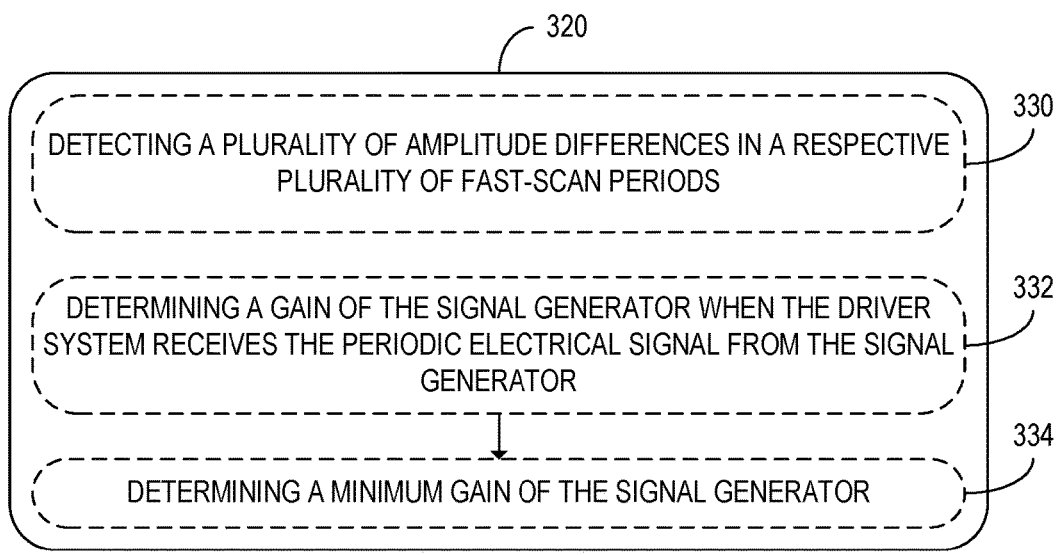

In some embodiments, determining the driver system resonant frequency at step 320 may include one of the following optional steps shown in FIG. 8C. At step 330, the method 300 may further include detecting a plurality of amplitude differences in a respective plurality of fast-scan periods. Step 330 may be performed, for example, when step 324 shown in FIG. 8B is performed. In embodiments in which the signal generator is configured to vary the output gain to maintain constant MEMS output amplitude, determining the driver system resonant frequency may include, at step 332, determining a gain over the frequency scan of the signal generator when the fast-scan driver system receives the periodic electrical signal from the signal generator. In some embodiments, at step 334, step 320 may further include determining a minimum gain of the signal generator. It will be appreciated that at resonance for the fast-scan MEMS mirror, the fast-scan MEMS mirror gain is at a maximum, and thus the driver gain of the nonlinear driver can be kept to a minimum, thereby keeping the energy consumption of the system to a minimum.

The systems and methods described above may allow the processor to dynamically update a determination of the driver system resonant frequency as the driver system resonant frequency changes over time. Thus, by generating a modified periodic electrical signal with a frequency adjusted for changes in the driver system resonant frequency, the fast-scan mirror may be driven in a manner that is energy-efficient and results in a clearly displayed image.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
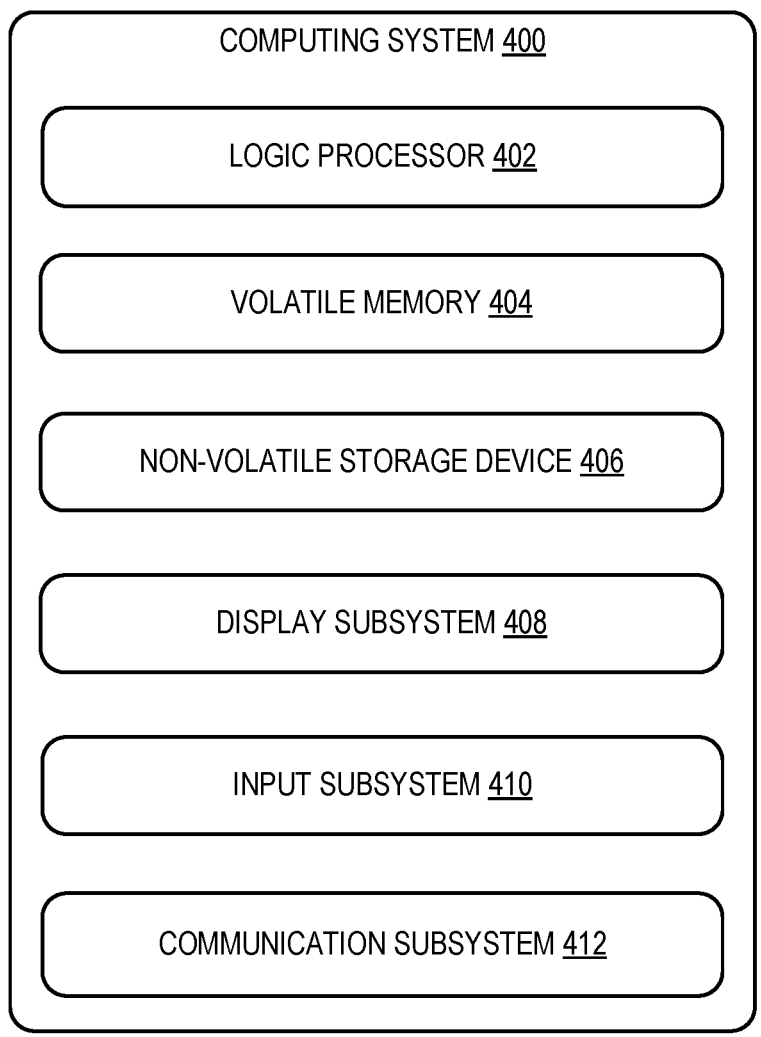
FIG. 9 shows a schematic view of an example computing environment in which the computer device of FIG. 1 may be enacted.

FIG. 9 schematically shows a non-limiting embodiment of a computing system 400 that can enact one or more of the methods and processes described above. Computing system 400 is shown in simplified form. Computing system 400 may embody the display device 10 described above and illustrated in FIG. 1. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 9.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

According to one aspect of the present disclosure, a display device is provided, including a laser beam emitter configured to emit a laser beam. The display device may further include a fast-scan driver system including a nonlinear driver and a fast-scan microelectromechanical (MEMS) sensor. The display device may further include and a slow-scan MEMS driver. The nonlinear driver and the slow-scan MEMS driver may be respectively configured to drive a fast-scan mirror and a slow-scan mirror. The slow-scan mirror and the fast-scan mirror may be configured to reflect the laser beam onto a display region. The display device may further include a signal generator configured to generate a periodic electrical signal having a first frequency in response to receiving periodic electrical signal instructions. The nonlinear driver may be configured to receive the periodic electrical signal from the signal generator. The nonlinear driver may be further configured to amplify the periodic electrical signal to produce an amplified signal. The nonlinear driver may be further configured to drive the fast-scan mirror with the amplified electrical signal. The fast-scan MEMS sensor may be configured to detect a motion of the fast-scan mirror. The display device may further include a signal detector configured to receive the periodic electrical signal from the signal generator and a fast-scan MEMS sensor output signal from the fast-scan MEMS sensor. The signal generator may be further configured to detect an amplitude difference between the periodic electrical signal and the fast-scan MEMS sensor output signal. The display device may further include a processor configured to receive the amplitude difference from the signal detector and determine, based on the amplitude difference, a driver system resonant frequency of the fast-scan driver system.

According to this aspect, the processor may be configured to determine the driver system resonant frequency at least in part by determining a phase difference between the periodic electrical signal and the fast-scan MEMS sensor output signal.

According to this aspect, the processor may be further configured to generate modified periodic electrical signal instructions based on the driver system resonant frequency and transmit the modified periodic electrical signal instructions to the signal generator. In response to receiving the modified periodic electrical signal instructions, the signal generator may be configured to generate a modified periodic electrical signal with a second frequency different from the first frequency.

According to this aspect, the second frequency may be the driver system resonant frequency.

According to this aspect, the processor may be configured to determine the driver system resonant frequency at least in part by detecting a plurality of amplitude differences in a respective plurality of fast-scan periods that occur during the non-display interval.

According to this aspect, the processor may be configured to generate the modified periodic electrical signal instructions at least in part by iteratively updating the first frequency over the plurality of fast-scan periods.

According to this aspect, the signal generator may include a phase-locked loop.

According to this aspect, the processor may be configured to generate the modified periodic electrical signal instructions at least in part by modifying a lock angle of the phase-locked loop to have a target lock angle.

According to this aspect, the processor may be configured to determine the driver system resonant frequency at least in part by determining a gain of the signal generator when the fast-scan driver system receives the periodic electrical signal from the signal generator.

According to this aspect, during the non-display interval, the slow-scan mirror may return from a final scanning position to an initial scanning position.

According to another aspect of the present disclosure, a method for use with a display device is provided. The method may include scanning a display region with a slow-scan mirror driven by a slow-scan microelectromechanical systems (MEMS) driver. In a fast-scan period of a fast-scan mirror driven by a nonlinear driver, the method may further include, at a signal generator, generating a periodic electrical signal. The periodic electrical signal may have a first frequency. The method may further include transmitting the periodic electrical signal to a signal detector and a nonlinear driver. The method may further include amplifying the periodic electrical signal at the nonlinear driver to produce an amplified signal. The method may further include driving the fast-scan mirror with the amplified electrical signal. At the signal detector, the method may further include receiving the periodic electrical signal and a fast-scan MEMS sensor output signal, detecting an amplitude difference between the periodic electrical signal and the fast-scan MEMS sensor output signal, and transmitting the amplitude difference to a processor. At the processor, the method may further include determining, based on the amplitude difference, a driver system resonant frequency of a fast-scan driver system including the nonlinear driver.

According to this aspect, determining the driver system resonant frequency may include determining a phase difference between the periodic electrical signal and the MEMS sensor output signal.

According to this aspect, the method may further include generating, based on the driver system resonant frequency, a modified periodic electrical signal with a second frequency different from the first frequency.

According to this aspect, the second frequency may be the driver system resonant frequency.

According to this aspect, determining the driver system resonant frequency may include detecting a plurality of amplitude differences in a respective plurality of fast-scan periods that occur during the non-display interval.

According to this aspect, generating the modified periodic electrical signal may include iteratively updating the first frequency over the plurality of fast-scan periods.

According to this aspect, the signal generator may include a phase-locked loop. Generating the modified periodic electrical signal may include modifying a lock angle of the phase-locked loop to have a target lock angle.

According to this aspect, determining the driver system resonant frequency may include determining a gain of the signal generator when the fast-scan driver system receives the periodic electrical signal from the signal generator.

According to this aspect, scanning the display region may include reflecting a laser beam off the slow-scan mirror and the fast-scan mirror onto the display region.

According to another aspect of the present disclosure, a display device is provided, including a laser beam emitter configured to emit a laser beam. The display device may further include a fast-scan driver system including a nonlinear driver and a fast-scan microelectromechanical (MEMS) sensor. The display device may further include and a slow-scan MEMS driver. The nonlinear driver and the slow-scan MEMS driver may be respectively configured to drive a fast-scan mirror and a slow-scan mirror. The slow-scan mirror and the fast-scan mirror may be configured to reflect the laser beam onto a display region. The display device may further include a signal generator that includes a phase-locked loop and is configured to generate a periodic electrical signal having a first frequency. The nonlinear driver may be configured to receive the periodic electrical signal from the signal generator, amplify the periodic electrical signal to produce an amplified signal, and drive the fast-scan mirror with the amplified electrical signal. The fast-scan MEMS sensor may be configured to detect a motion of the fast-scan mirror. The display device may further include a signal detector configured to receive the periodic electrical signal from the signal generator and a fast-scan MEMS sensor output signal from the fast-scan MEMS sensor. The signal detector may be further configured to detect an amplitude difference between the periodic electrical signal and the fast-scan MEMS sensor output signal. The display device may further include a processor configured to receive the amplitude difference from the signal detector and determine, based on the amplitude difference, a gain of the signal generator. The processor may be further configured to generate, based on the gain, a modified periodic electrical signal with a second frequency different from the first frequency.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device comprising:
a laser beam emitter configured to emit a laser beam;
a fast-scan driver system including a nonlinear driver and a fast-scan microelectromechanical (MEMS) sensor;
a slow-scan MEMS driver, wherein:
the nonlinear driver and the slow-scan MEMS driver are respectively configured to drive a fast-scan mirror and a slow-scan mirror; and
the slow-scan mirror and the fast-scan mirror are configured to reflect the laser beam onto a display region;
a signal generator configured to generate a periodic electrical signal having a first frequency in response to receiving periodic electrical signal instructions, wherein the nonlinear driver is configured to:
receive the periodic electrical signal from the signal generator;
amplify the periodic electrical signal to produce an amplified signal; and
drive the fast-scan mirror with the amplified electrical signal, wherein the fast-scan MEMS sensor is configured to detect a motion of the fast-scan mirror;
a signal detector configured to:
receive the periodic electrical signal from the signal generator and a fast-scan MEMS sensor output signal from the fast-scan MEMS sensor; and
detect an amplitude difference between the periodic electrical signal and the fast-scan MEMS sensor output signal; and
a processor configured to:
receive the amplitude difference from the signal detector; and
determine, based on the amplitude difference, a driver system resonant frequency of the fast-scan driver system.

2. The display device of claim 1, wherein the processor is configured to determine the driver system resonant frequency at least in part by determining a phase difference between the periodic electrical signal and the fast-scan MEMS sensor output signal.

3. The display device of claim 1, wherein:
the processor is further configured to:
generate modified periodic electrical signal instructions based on the driver system resonant frequency; and
transmit the modified periodic electrical signal instructions to the signal generator; and
in response to receiving the modified periodic electrical signal instructions, the signal generator is configured to generate a modified periodic electrical signal with a second frequency different from the first frequency.

4. The display device of claim 3, wherein the second frequency is the driver system resonant frequency.

5. The display device of claim 3, wherein the processor is configured to determine the driver system resonant frequency at least in part by detecting a plurality of amplitude differences in a respective plurality of fast-scan periods that occur during the non-display interval.

6. The display device of claim 5, wherein the processor is configured to generate the modified periodic electrical signal instructions at least in part by iteratively updating the first frequency over the plurality of fast-scan periods.

7. The display device of claim 3, wherein the signal generator includes a phase-locked loop.

8. The display device of claim 7, wherein the processor is configured to generate the modified periodic electrical signal instructions at least in part by modifying a lock angle of the phase-locked loop to have a target lock angle.

9. The display device of claim 7, wherein the processor is configured to determine the driver system resonant frequency at least in part by determining a gain of the signal generator when the fast-scan driver system receives the periodic electrical signal from the signal generator.

10. The display device of claim 1, wherein, during the non-display interval, the slow-scan mirror returns from a final scanning position to an initial scanning position.

11. A method for use with a display device, the method comprising:
scanning a display region with a slow-scan mirror driven by a slow-scan microelectromechanical systems (MEMS) driver; and
in a fast-scan period of a fast-scan mirror driven by a nonlinear driver:
at a signal generator, generating a periodic electrical signal, the periodic electrical signal having a first frequency;
transmitting the periodic electrical signal to a signal detector and a nonlinear driver;
amplifying the periodic electrical signal at the nonlinear driver to produce an amplified signal;
driving the fast-scan mirror with the amplified electrical signal;
at the signal detector:
receiving the periodic electrical signal and a fast-scan MEMS sensor output signal;
detecting an amplitude difference between the periodic electrical signal and the fast-scan MEMS sensor output signal; and
transmitting the amplitude difference to a processor; and
at the processor, determining, based on the amplitude difference, a driver system resonant frequency of a fast-scan driver system including the nonlinear driver.

12. The method of claim 11, wherein determining the driver system resonant frequency includes determining a phase difference between the periodic electrical signal and the MEMS sensor output signal.

13. The method of claim 11, further comprising generating, based on the driver system resonant frequency, a modified periodic electrical signal with a second frequency different from the first frequency.

14. The method of claim 13, wherein the second frequency is the driver system resonant frequency.

15. The method of claim 13, wherein determining the driver system resonant frequency includes detecting a plurality of amplitude differences in a respective plurality of fast-scan periods that occur during the non-display interval.

16. The method of claim 15, wherein generating the modified periodic electrical signal includes iteratively updating the first frequency over the plurality of fast-scan periods.

17. The method of claim 13, wherein:
the signal generator includes a phase-locked loop; and
generating the modified periodic electrical signal includes modifying a lock angle of the phase-locked loop to have a target lock angle.

18. The method of claim 17, wherein determining the driver system resonant frequency includes determining a gain of the signal generator when the fast-scan driver system receives the periodic electrical signal from the signal generator.

19. The method of claim 11, wherein scanning the display region includes reflecting a laser beam off the slow-scan mirror and the fast-scan mirror onto the display region.

20. A display device comprising:
a laser beam emitter configured to emit a laser beam;
a fast-scan driver system including a nonlinear driver and a fast-scan MEMS sensor;
a slow-scan MEMS driver, wherein:
   the nonlinear driver and the slow-scan MEMS driver are respectively configured to drive a fast-scan mirror and a slow-scan mirror; and
   the slow-scan mirror and the fast-scan mirror are configured to reflect the laser beam onto a display region;
a signal generator that includes a phase-locked loop and is configured to generate a periodic electrical signal having a first frequency, wherein the nonlinear driver is configured to:
   receive the periodic electrical signal from the signal generator;
   amplify the periodic electrical signal to produce an amplified signal; and
   drive the fast-scan mirror with the amplified electrical signal, wherein the fast-scan MEMS sensor is configured to detect a motion of the fast-scan mirror;
a signal detector configured to:
   receive the periodic electrical signal from the signal generator and a fast-scan MEMS sensor output signal from the fast-scan MEMS sensor;
   detect an amplitude difference between the periodic electrical signal and the fast-scan MEMS sensor output signal; and
a processor configured to:
   receive the amplitude difference from the signal detector; and
   determine, based on the amplitude difference, a gain of the signal generator; and
   generate, based on the gain, a modified periodic electrical signal with a second frequency different from the first frequency.

* * * * *